United States Patent
Sakhnini et al.

(10) Patent No.: US 12,081,484 B2
(45) Date of Patent: Sep. 3, 2024

(54) USER EQUIPMENT (UE) RECOMMENDED SOUNDING REFERENCE SIGNAL (SRS) RESOURCE INDEX (SRI)

(71) Applicant: QUALCOMM Incorporated, San Diego, CA (US)

(72) Inventors: Iyab Issam Sakhnini, San Diego, CA (US); Tao Luo, San Diego, CA (US); Yan Zhou, San Diego, CA (US); Jelena Damnjanovic, Del Mar, CA (US); Mahmoud Taherzadeh Boroujeni, San Diego, CA (US); Wanshi Chen, San Diego, CA (US); Wooseok Nam, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 152 days.

(21) Appl. No.: 17/392,515

(22) Filed: Aug. 3, 2021

(65) Prior Publication Data

US 2022/0045823 A1    Feb. 10, 2022

Related U.S. Application Data

(60) Provisional application No. 63/062,913, filed on Aug. 7, 2020.

(51) Int. Cl.
  *H04B 7/06*    (2006.01)
  *H04L 5/00*    (2006.01)
(52) U.S. Cl.
  CPC .................. *H04L 5/0053* (2013.01)

(58) Field of Classification Search
  CPC ..... H04L 5/0053; H04L 5/006; H04L 5/0094; H04L 5/001; H04B 7/0695
  See application file for complete search history.

(56) References Cited

U.S. PATENT DOCUMENTS

| | | | | |
|---|---|---|---|---|
| 11,641,232 B2 * | 5/2023 | Kang | .............. | H04B 7/0626 370/329 |
| 2019/0334608 A1 * | 10/2019 | Kwon | .............. | H04B 7/18582 |
| 2020/0100232 A1 * | 3/2020 | Onggosanusi | ........ | H04W 72/23 |
| 2020/0112966 A1 * | 4/2020 | Liu | .............. | H04L 5/0051 |

(Continued)

FOREIGN PATENT DOCUMENTS

| | | | | |
|---|---|---|---|---|
| CN | 109462425 | * | 3/2019 | .......... H04B 7/0408 |
| EP | 3393198 A1 | | 10/2018 | |

(Continued)

OTHER PUBLICATIONS

3GPP TSG-RAN WG1#87, R !- 1612868 Title: One aperiodic DL beam training (Year: 2016).*

(Continued)

*Primary Examiner* — Faruk Hamza
*Assistant Examiner* — Abusayeed M Haque
(74) *Attorney, Agent, or Firm* — Patterson & Sheridan LLP

(57) ABSTRACT

Certain aspects of the present disclosure provide techniques for sounding reference signal (SRS) resource index (SRI) selection. A method that may be performed by a user equipment (UE) generally includes receiving at least one reference signal (RS), performing an RS measurement based on the at least one RS, and transmitting, to a base station (BS), at least one first message indicating a recommendation for SRI selection determined based on the RS measurement.

28 Claims, 9 Drawing Sheets

(56) References Cited

U.S. PATENT DOCUMENTS

| | | | |
|---|---|---|---|
| 2020/0274679 A1* | 8/2020 | Futaki | H04L 5/0048 |
| 2020/0313831 A1* | 10/2020 | Kim | H04L 5/001 |
| 2020/0314860 A1* | 10/2020 | Zhou | H04W 72/23 |
| 2021/0044343 A1* | 2/2021 | Onggosanusi | H04B 7/0695 |
| 2021/0176797 A1* | 6/2021 | Kang | H04W 74/0833 |
| 2021/0235425 A1* | 7/2021 | Kim | H04W 72/23 |
| 2021/0351888 A1* | 11/2021 | Park | H04W 72/51 |
| 2022/0141816 A1 | 5/2022 | Ling et al. | |
| 2022/0241816 A1* | 8/2022 | McGuire, Jr. | B05D 7/576 |

FOREIGN PATENT DOCUMENTS

| | | | | |
|---|---|---|---|---|
| WO | WO-2017223201 A1 * | 12/2017 | | H04B 17/24 |
| WO | 2020147737 A1 | 7/2020 | | |
| WO | WO-2020174437 A1 * | 9/2020 | | G02F 1/167 |

OTHER PUBLICATIONS

3GPP TSG-TSG RAN WG Meeting #96, R1-1903262 (Year: 2019).*
3GPP TSG-TSG RAN WG Meeting #96, R1-190265 (Year: 2019).*
3GPP TSG-RAN WG1#87, R1-1612868 Title: One aperiodic DL beam training (Year: 2016).*
Ericsson: "New SID on Support of Reduced Capability NR Devices," 3GPP TSG RAN Meeting #86, RP-193238, Sitges, Spain, Dec. 9-12, 2019, 5 Pages.

* cited by examiner

USER EQUIPMENT (UE) RECOMMENDED SOUNDING REFERENCE SIGNAL (SRS) RESOURCE INDEX (SRI)

CROSS-REFERENCE TO RELATED APPLICATION

This application claims benefit of and priority to U.S. Provisional Application No. 63/062,913 filed Aug. 7, 2020, which is hereby assigned to the assignee hereof and hereby expressly incorporated by reference herein in its entirety as if fully set forth below and for all applicable purposes.

BACKGROUND

Field of the Disclosure

Aspects of the present disclosure relate to wireless communications, and more particularly, to techniques for sounding reference signal (SRS) resource index (SRI) recommendation and selection.

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

As the demand for mobile broadband access continues to increase, there exists a need for further improvements in NR and LTE technology. These improvements should be applicable to other multi-access technologies and the telecommunication standards that employ these technologies.

SUMMARY

The systems, methods, and devices of the disclosure each have several aspects, no single one of which is solely responsible for its desirable attributes. After considering this discussion, and particularly after reading the section entitled "Detailed Description" one will understand how the features of this disclosure provide advantages that include improved sounding reference signal (SRS) resource index (SRI) recommendation and selection.

Certain aspects of the subject matter described in this disclosure can be implemented in a method for wireless communication by a user equipment (UE). The method generally includes receiving at least one reference signal (RS); performing an RS measurement based on the at least one RS; and transmitting, to a base station (BS), at least one first message indicating a recommendation for SRI selection determined based on the RS measurement.

Certain aspects of the subject matter described in this disclosure can be implemented in a method for wireless communication by a BS. The method generally includes generating at least one RS; transmitting the at least one RS; and receiving, from a UE, at least one first message indicating a recommendation for SRI selection based on the at least one RS.

Certain aspects of the subject matter described in this disclosure can be implemented in an apparatus for wireless communication by a UE. The apparatus generally includes: a memory; and one or more processors coupled to the memory, the memory and the one or more processors being configured to: receive at least one RS; perform an RS measurement based on the at least one RS; and transmit, to a BS, at least one first message indicating a recommendation for SRI selection determined based on the RS measurement.

Certain aspects of the subject matter described in this disclosure can be implemented in an apparatus for wireless communication by a BS. The apparatus generally includes: a memory; and one or more processors coupled to the memory, the memory and the one or more processors being configured to: generate at least one RS; transmit the at least one RS; and receive, from a UE, at least one first message indicating a recommendation for SRI selection based on the at least one RS.

Certain aspects of the subject matter described in this disclosure can be implemented in an apparatus for wireless communication by a UE. The apparatus generally includes: means for receiving at least one RS; performing an RS measurement based on the at least one RS; and means for transmitting, to a BS, at least one first message indicating a recommendation for SRI selection determined based on the RS measurement.

Certain aspects of the subject matter described in this disclosure can be implemented in an apparatus for wireless communication by a BS. The apparatus generally includes: means for generating at least one RS; means for transmitting the at least one RS; and means for receiving, from a UE, at least one first message indicating a recommendation for SRI selection based on the at least one RS.

Certain aspects of the subject matter described in this disclosure can be implemented in a computer-readable medium having instructions stored thereon to cause a UE to: receive at least one RS; perform an RS measurement based on the at least one RS; and transmit, to a BS, at least one first message indicating a recommendation for SRI selection determined based on the RS measurement.

Certain aspects of the subject matter described in this disclosure can be implemented in a computer-readable medium having instructions stored thereon to cause a BS to: generate at least one RS; transmit the at least one RS; and receive, from a UE, at least one first message indicating a recommendation for SRI selection based on the at least one RS.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure, and the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
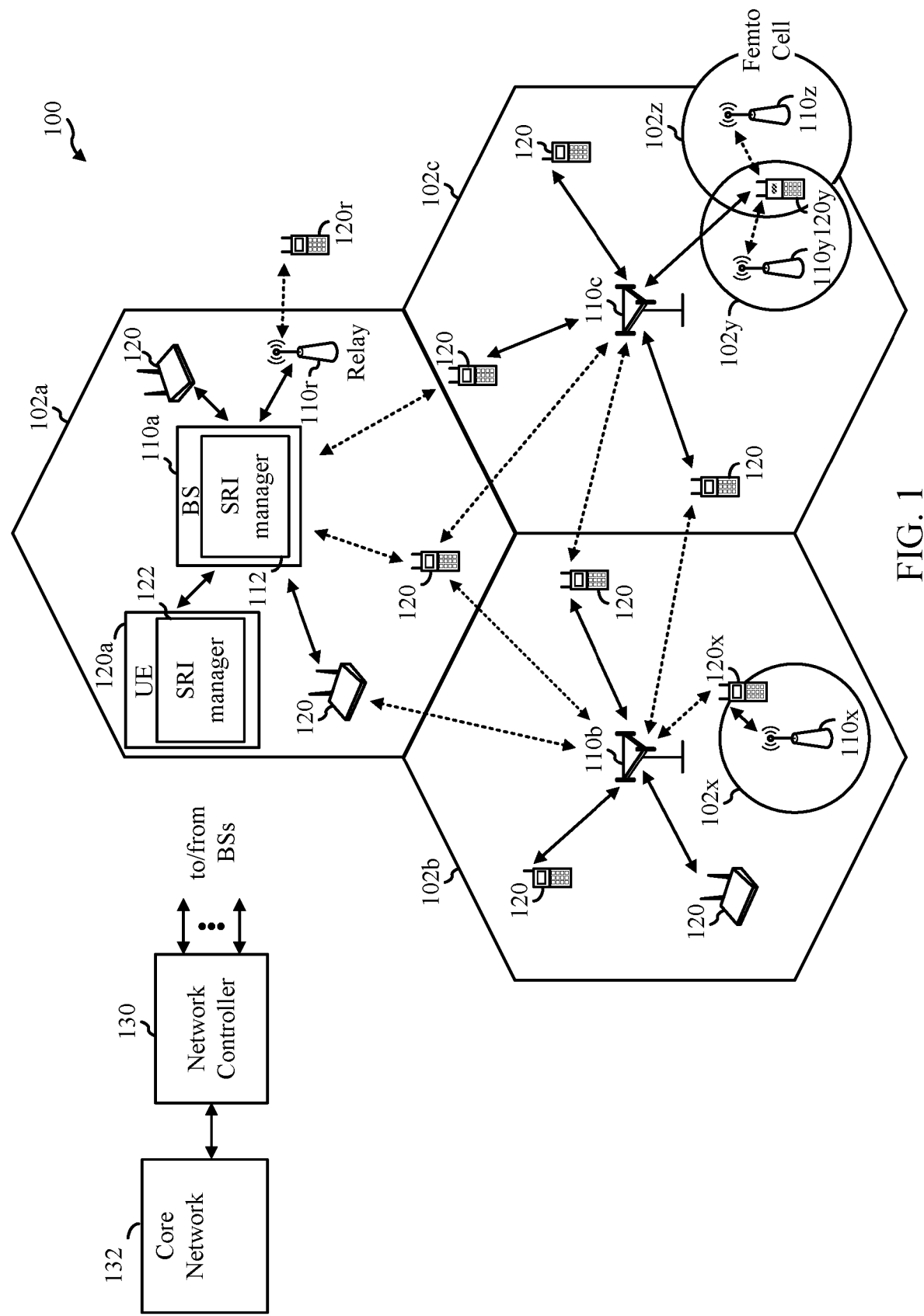
FIG. 1 is a block diagram conceptually illustrating an example telecommunications system, in accordance with certain aspects of the present disclosure.

Aspects of the present disclosure provide apparatus, methods, processing systems, and computer readable mediums for sounding reference signal (SRS) resource index (SRI) recommendation and selection. In conventional implementations, layer 1 (L1) measurement reporting occasions may be used by a user equipment (UE) to report synchronization signal block (SSB)/channel state information (CSI)-reference signal (RS) measurements associated with one or more uplink (UL) beams to indicate UL beam quality to a base station (BS). The BS may use these reported measurements to determine whether an SRI switch or beam training procedure is to be performed. However, in some cases (e.g., for reduced capability ("RedCap") UEs), such L1 measurement reporting occasions may be sparsely configured by the BS to reduce UL resources and UE power. Thus, in cases where a UE measures poor quality on an SSB/CSI-RS associated with an active SRI, if the configured reporting occasions are sparse and/or a periodic SRS beam training opportunity is not readily available, the UE may be stuck with a poor quality beam for UL transmission (e.g., at least until a next configured reporting occasion or available beam training opportunity). Accordingly, aspects described herein relate to techniques for SRI recommendation by a UE which may allow for the sparse configuration of L1 measurement reports (e.g., to reduce UL resources and UE power) without sacrificing beam quality in UL transmissions.

For example, in some aspects, a UE may monitor downlink (DL) RS(s) and perform RS measurements. Based on the RS measurements, the UE may determine an SRI to be used for UL signaling, an SRI to be excluded from consideration when the BS is performing SRI selection, or both. The UE may transmit, to a BS, a message including a recommendation of the SRI to be used (and/or excluded). The BS may consider the recommendation received from the UE, and transmit a configuration message, back to the UE, indicating an SRI to be used for UL signaling. Accordingly, the techniques described herein provide alternatives to SRI selection by enabling a UE to recommend an SRI to a BS for SRI selection, instead of the UE waiting for a configured reporting occasion to report UL beam quality.

The following description provides examples of SRI selection in communication systems, and is not limiting of the scope, applicability, or examples set forth in the claims. Changes may be made in the function and arrangement of elements discussed. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs.

The techniques described herein may be used for various wireless networks and radio technologies. While aspects may be described herein using terminology commonly associated with 3G, 4G, and/or new radio (e.g., 5G NR) wireless technologies, aspects of the present disclosure can be applied in other generation-based communication systems.

NR access may support various wireless communication services, such as enhanced mobile broadband (eMBB) targeting wide bandwidth (e.g., 80 megahertz (MHz) or beyond), millimeter wave (mmW) targeting high carrier frequency (e.g., 25 gigahertz (GHz) or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTIs) to meet respective quality of service (QoS) requirements. In addition, these services may co-exist in the same subframe. NR supports beamforming and beam direction may be dynamically configured. MIMO transmissions with precoding may also be supported. MIMO configurations in the downlink (DL) may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

FIG. 1 illustrates an example wireless communication network 100 in which aspects of the present disclosure may be performed. For example, the wireless communication network 100 may be an NR system (e.g., a 5G NR network). As shown in FIG. 1, the wireless communication network 100 may be in communication with a core network 132. The core network 132 may be in communication with one or more BSs 110 and/or UEs 120 in the wireless communication network 100 via one or more interfaces.

As illustrated in FIG. 1, the wireless communication network 100 may include a number of BSs 110a-z (each also individually referred to herein as BS 110 or collectively as BSs 110) and other network entities. A BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs 110 or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. ABS 110 may support one or multiple cells. A network controller 130 may couple to a set of BSs 110 and provide coordination and control for these BSs 110 (e.g., via a backhaul).

BSs 110 communicate with UEs 120a-y (each also individually referred to herein as UE 120 or collectively as UEs 120) in the wireless communication network 100. UEs 120 (e.g., 120x, 120y, etc.) may be dispersed throughout the wireless communication network 100, and each UE 120 may be stationary or mobile. Wireless communication network 100 may also include relay stations (e.g., relay station 110r), also referred to as relays or the like, that receive a transmission of data and/or other information from an upstream station (e.g., a BS 110a or a UE 120r) and sends a transmission of the data and/or other information to a downstream station (e.g., a UE 120 or a BS 110), or that relays transmissions between UEs 120, to facilitate communication between devices.

According to certain aspects, BSs 110 and UEs 120 may be configured for SRI selection. As shown in FIG. 1, BS 110a includes an SRI manager 112. SRI manager 112 may be configured for generating at least one reference signal (RS), transmitting the at least one RS, and receiving, from a UE, at least one first message indicating a recommendation for SRI selection based on the at least one RS, in accordance with certain aspects of the present disclosure. Similarly, as shown in FIG. 1, UE 120a includes an SRI manager 122. SRI manager 122 may be configured for receiving at least one RS, performing an RS measurement based on the at least one RS, determining a recommendation for SRI selection based on the RS measurement, and transmitting at least one first message indicating the recommendation to a BS, in accordance with certain aspects of the present disclosure.

Figure 2:
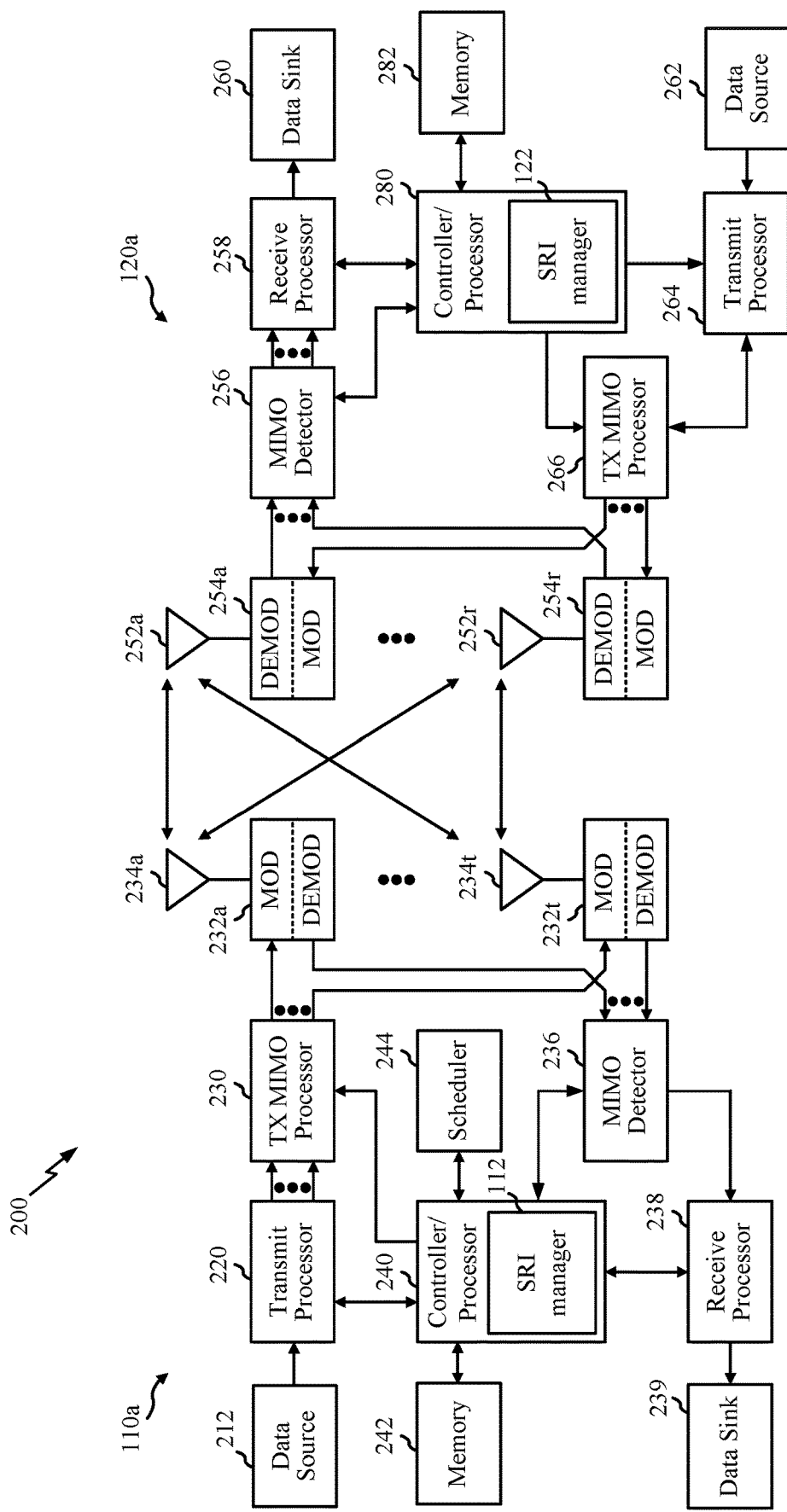
FIG. 2 is a block diagram conceptually illustrating a design of an example a base station (BS) and user equipment (UE), in accordance with certain aspects of the present disclosure.

FIG. 2 illustrates example components 200 of BS 110a and UE 120a (e.g., in the wireless communication network 100 of FIG. 1), which may be used to implement aspects of the present disclosure.

At the BS 110a, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. A medium access control (MAC)-control element (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a physical sidelink shared channel (PSSCH).

Processor 220 may process (e.g., encode and symbol map) the data and control information to obtain data symbols and control symbols, respectively. Transmit processor 220 may also generate reference symbols, such as for the primary synchronization signal (PSS), secondary synchronization signal (SSS), and channel state information reference signal (CSI-RS). A transmit (TX) multiple-input multiple-output (MIMO) processor 230 may perform spatial processing (e.g., precoding) on the data symbols, the control symbols, and/or the reference symbols, if applicable, and may provide output symbol streams to modulators (MODs) in transceivers 232a-232t. Each modulator in transceivers 232a-232t may process a respective output symbol stream (e.g., for orthogonal frequency division multiplexing (OFDM), etc.) to obtain an output sample stream. Each modulator may further process (e.g., convert to analog, amplify, filter, and upconvert) the output sample stream to obtain a DL signal. DL signals from modulators in transceivers 232a-232t may be transmitted via the antennas 234a-234t, respectively.

At UE 120a, antennas 252a-252r may receive the DL signals from BS 110a and may provide received signals to demodulators (DEMODs) in transceivers 254a-254r, respectively. Each demodulator in transceivers 254a-254r may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators in transceivers 254a-254r, perform MIMO detection on the received symbols if applicable, and provide detected symbols. A receive processor 258 may process (e.g., demodulate, deinterleave, and decode) the detected symbols, provide decoded data for the UE 120a to a data sink 260, and provide decoded control information to a controller/processor 280.

On the uplink (UL), at UE 120a, a transmit processor 264 may receive and process data (e.g., for the PUSCH) from a data source 262 and control information (e.g., for the physical uplink control channel (PUCCH) from the controller/processor 280. Transmit processor 264 may also generate reference symbols for a RS (e.g., for the SRS). The symbols from transmit processor 264 may be precoded by a TX MIMO processor 266 if applicable, further processed by modulators (MODs) in transceivers 254a-254r (e.g., for single-carrier frequency division multiplexing (SC-FDM), etc.), and transmitted to BS 110a. At BS 110a, the UL signals from UE 120a may be received by antennas 234, processed by modulators in transceivers 232a-232t, detected by a MIMO detector 236 if applicable, and further processed by a receive processor 238 to obtain decoded data and control information sent by UE 120a. Receive processor 238 may provide the decoded data to a data sink 239 and the decoded control information to controller/processor 240.

Memories 242 and 282 may store data and program codes for BS 110a and UE 120a, respectively. A scheduler 244 may schedule UEs for data transmission on the DL and/or UL.

Antennas 252, processors 266, 258, 264, and/or controller/processor 280 of UE 120a and/or antennas 234, processors 220, 230, 238, and/or controller/processor 240 of BS 110a may be used to perform the various techniques and methods described herein. For example, as shown in FIG. 2, controller/processor 240 of BS 110a includes SRI manager 112 configured to perform operations 400 of FIG. 4, according to certain aspects described herein. Similarly, as shown in FIG. 2, controller/processor 280 of UE 120a includes SRI manager 122 configured to perform operations 500 of FIG. 5, according to aspects described herein. Although shown at controller/processor 240 and controller/processor 280, other components of the UE 120a and BS 110a, respectively, may be used to perform the operations described herein.

NR may utilize OFDM with a cyclic prefix (CP) on the UL and DL. NR may support half-duplex operation using time division duplexing (TDD). OFDM and SC-FDM partition the system bandwidth into multiple orthogonal subcarriers, which are also commonly referred to as tones, bins, etc. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers. The system bandwidth may also be partitioned into subbands. For example, a subband may cover multiple RBs. NR may support a base subcarrier spacing (SCS) of 15 kilohertz (KHz) and other SCS may be defined with respect to the base SCS (e.g., 30 kHz, 60 kHz, 120 kHz, 240 kHz, etc.).

Figure 3:
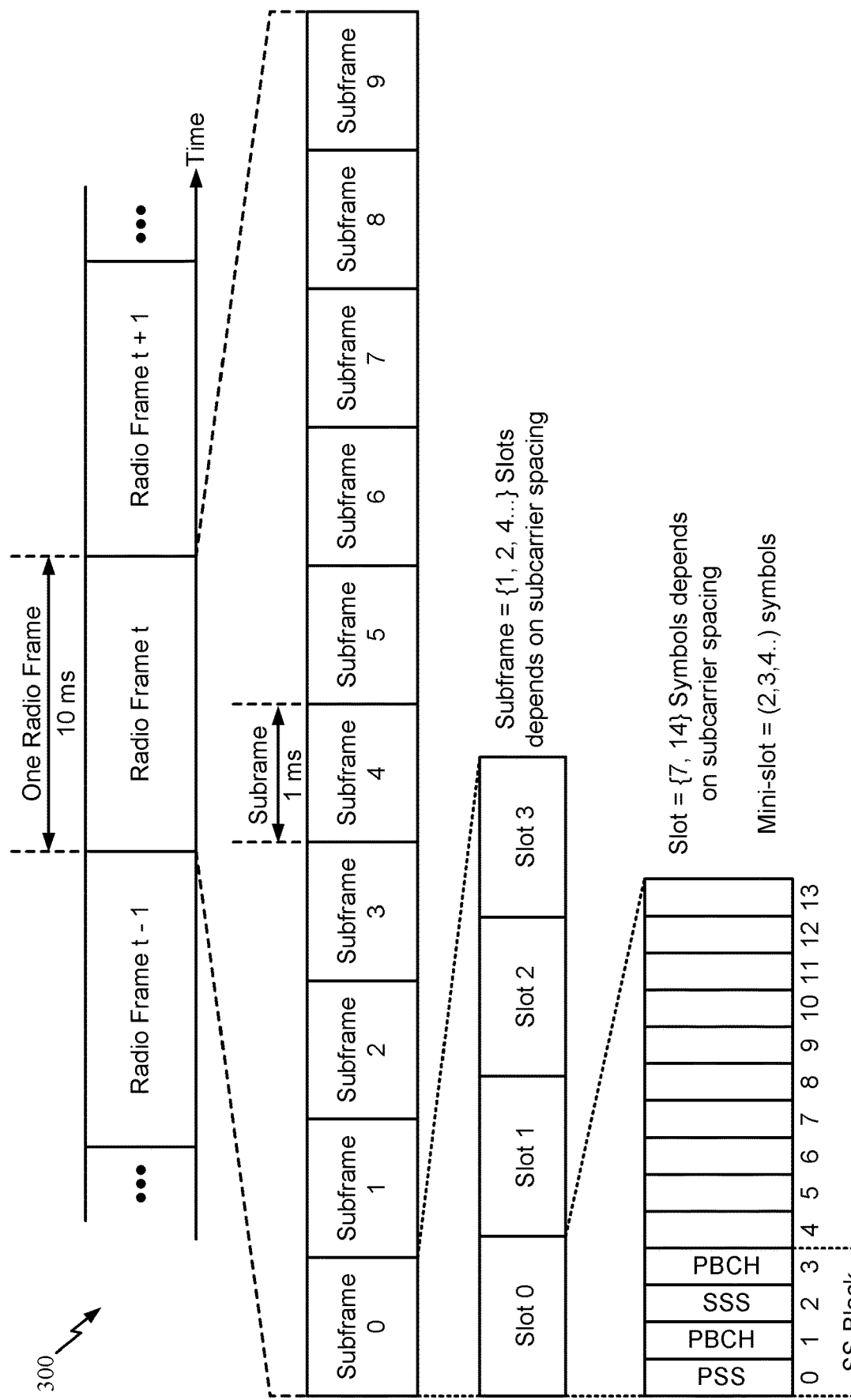
FIG. 3 is an example frame format for new radio (NR), in accordance with certain aspects of the present disclosure.

FIG. 3 is a diagram showing an example of a frame format 300 for NR, in accordance with certain aspects of the present disclosure. The transmission timeline for each of the DL and UL may be partitioned into units of radio frames. Each radio frame may have a predetermined duration (e.g., 10 milliseconds (ms)) and may be partitioned into 10 subframes, each of 1 ms, with indices of 0 through 9. Each subframe may include a variable number of slots (e.g., 1, 2, 4, 8, 16, . . . slots) depending on the SCS. Each slot may include a variable number of symbol periods (e.g., 7 or 14 symbols) depending on the SCS. The symbol periods in each slot may be assigned indices. A mini-slot, which may be referred to as a sub-slot structure, refers to a TTI having a duration less than a slot (e.g., 2, 3, or 4 symbols). Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

Example Techniques for User Equipment (UE) Recommended Sounding Reference Signal (SRS) Resource Index (SRI)

Various technologies may be the focus of current wireless communication standards. For example, in 3GPP Release 17 (Rel-17) and beyond, there may exist a desire for new radio (NR) to be scalable and deployable in a more efficient and cost-effective ways. Thus, some new radio (NR) devices may be implemented with reduced capabilities. In particular, reduced capability devices (also referred to as "RedCap devices") may exhibit a general relaxation of peak throughput, as well as lower latency and/or reliability requirements. RedCap devices may have various use cases such as industrial wireless sensors or video surveillance devices. For example, industrial wireless sensors may have a latency of less than 100 milliseconds (ms), and for safety reasons, a latency as low as 5-10 ms. Further, industrial wireless sensors may be uplink (UL) heavy, and stationary. Similarly, video surveillance devices may have a latency of less than 500 ms, may be UL heavy, and stationary.

For RedCap UEs, the combination of UL heavy/dominated traffic pattern application and reduced power consumption motivates the idea of reducing downlink (DL) reference signals. Because UEs may be stationary, channel conditions and relative strength of beams may be semi-static, and the network (NW) (e.g., network entity, base station (BS), next generation NodeB (gNB or gNodeB), etc.) may configure sparse layer 1 (L1) measurement reports to reduce UL resources and UE power. In NR, it may be assumed that UL beam quality is based on an associated synchronization signal block (SSB)/channel state information (CSI)-reference signal (RS) measurement that uses the same spatial filter.

In cases where a UE is measuring worse quality on an SSB/CSI-RS associated with an active sounding reference signal (SRS) resource index (SRI) and a better quality on some other SSB/CSI-RS associated with another SRI, the UE may transmit an L1 measurement report to the NW with the SSB/CSI-RS measurements. The NW may decide to switch the SRI (or participate in a UE UL beam training) based on the received L1 measurement report. As used herein, beam training generally refers to a beamforming process for finding an improved UL transmission/reception beam and DL transmission/reception beam. However, if the configured reports are sparse and a report occasion (e.g., an interval a UE uses to transmit an L1 measurement report) and/or a periodic SRS beam training opportunity is not readily available, the UE may be stuck with a bad UL beam (e.g., an UL beam with poor beam quality). Also, there may be cases of sudden blockage where there may be little time for reporting L1 measurements before saving UL signaling.

Certain aspects of the present disclosure are directed to the transmission of an SRI change request (also referred to herein as a recommendation for SRI selection) based on DL measurements performed by the UE, thereby allowing the NW to more sparsely configure L1 measurement reports and, instead, rely on the request for UL SRI. While RedCap devices are provided as one example of device types for which the aspects of the present disclosure may be applied, the aspects described herein may be applied for any suitable wireless devices.

Figure 4:
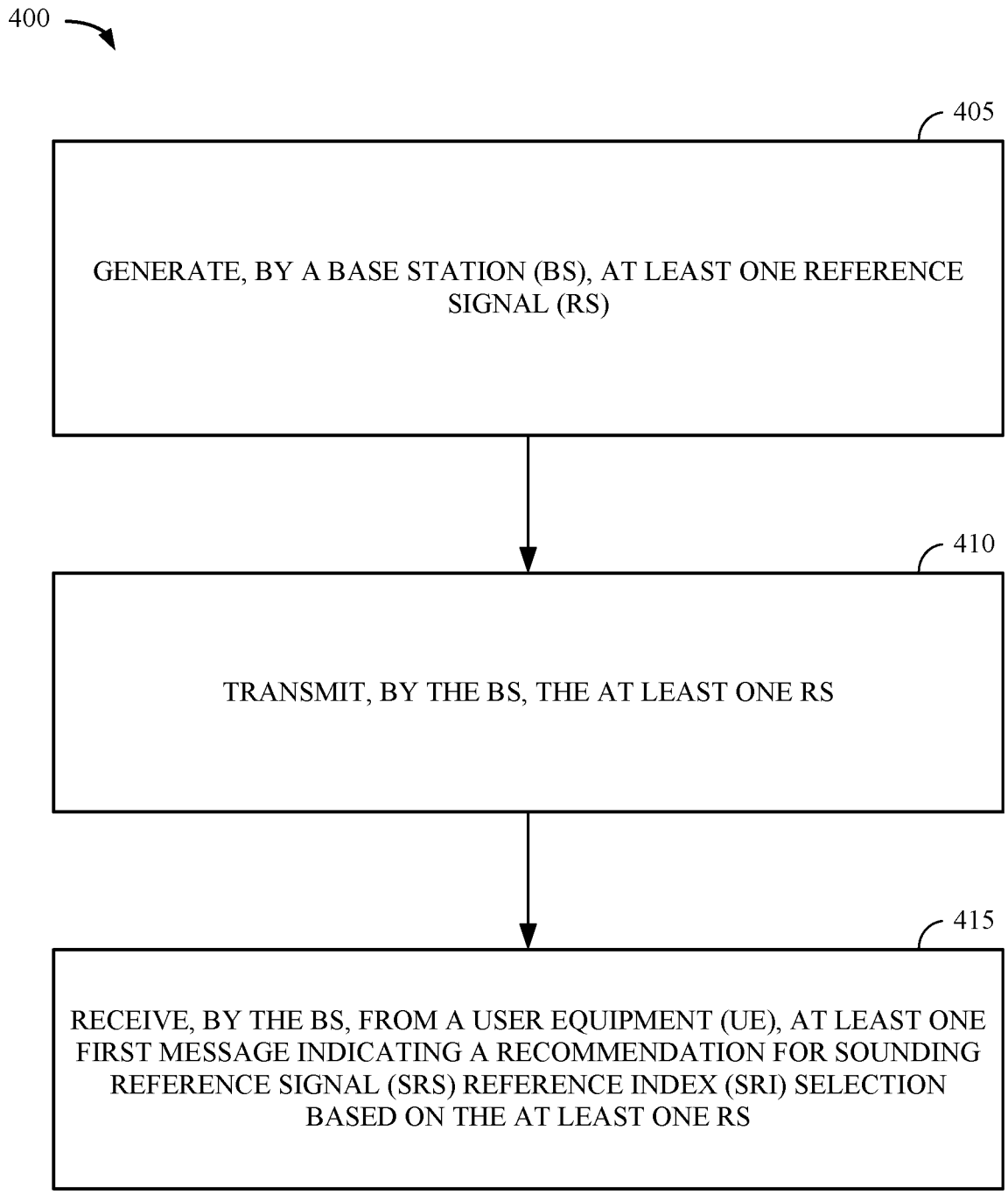
FIG. 4 is a flow diagram illustrating example operations for wireless communication by a BS, in accordance with certain aspects of the present disclosure.

FIG. 4 is a flow diagram illustrating example operations 400 for wireless communication by a BS, in accordance with certain aspects of the present disclosure. Operations 400 may be performed, for example, by BS 110a in wireless communication network 100 of FIG. 1.

Operations 400 may be implemented as software components that are executed and run on one or more processors (e.g., controller/processor 240 of FIG. 2). Further, the transmission and reception of signals by the BS in operations 400 may be enabled, for example, by one or more antennas (e.g., antennas 234 of FIG. 2). In certain aspects, the transmission and/or reception of signals by the BS may be implemented via a bus interface of one or more processors (e.g., controller/processor 240) obtaining and/or outputting signals.

Operations 400 begin, at block 405, by the BS generating at least one RS, and at block 410, transmitting the at least one RS. The at least one RS may include a CSI-RS, an SSB, or a demodulation RS (DMRS). At block 415, the BS receives, from a UE, at least one first message indicating a recommendation for SRI selection based on the at least one RS.

Figure 5:
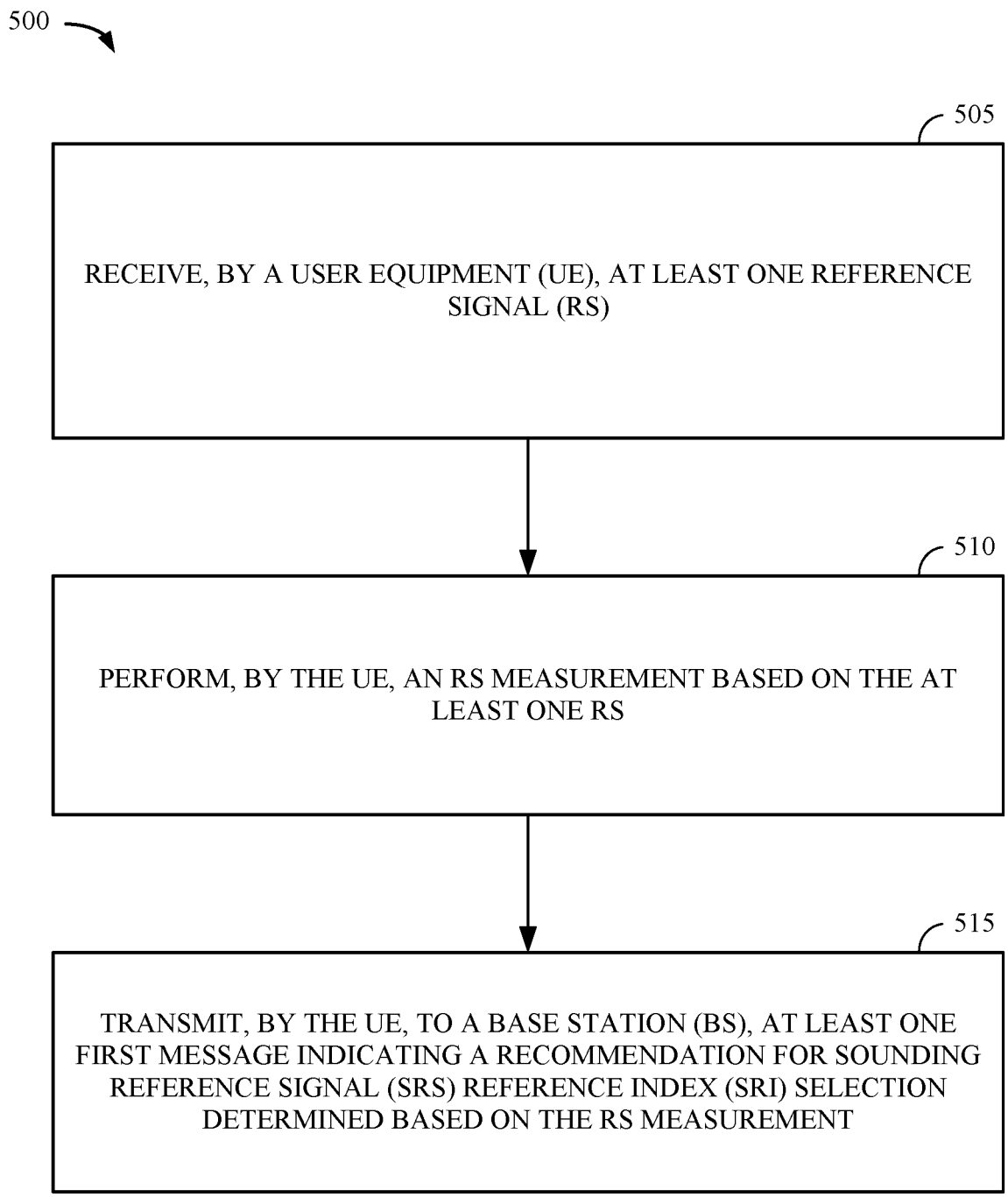
FIG. 5 is a flow diagram illustrating example operations for wireless communication by a UE, in accordance with certain aspects of the present disclosure.

FIG. 5 is a flow diagram illustrating example operations 500 for wireless communication by a UE, in accordance with certain aspects of the present disclosure. Operations 500 may be performed, for example, by UE 120a in wireless communication network 100 of FIG. 1.

Operations 500 may be complementary operations by the UE to the operations 400 performed by the BS. Operations 500 may be implemented as software components that are executed and run on one or more processors (e.g., controller/processor 280 of FIG. 2). Further, the transmission and reception of signals by the UE in operations 500 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

Operations 500 begin, at block 505, by the UE receiving at least one RS, and at block 510, performing an RS measurement based on the at least one RS. The at least one RS may include a CSI-RS, an SSB, or a DMRS. At block 515, the UE transmits, to a B S, at least one first message indicating a recommendation for SRI selection determined based on the RS measurement. In certain aspects, the recommendation may include a recommendation of one or more SRIs to be used for UL signaling by the UE. In some aspects, the recommendation may include a recommendation of one or more SRIs to be excluded from consideration when the BS is performing the SRI selection. In certain aspects, the UE may receive, from the BS, a second message indicating an SRI selected based on the recommendation, and further transmit UL signaling based on the selected SRI to the BS.

Figure 6:
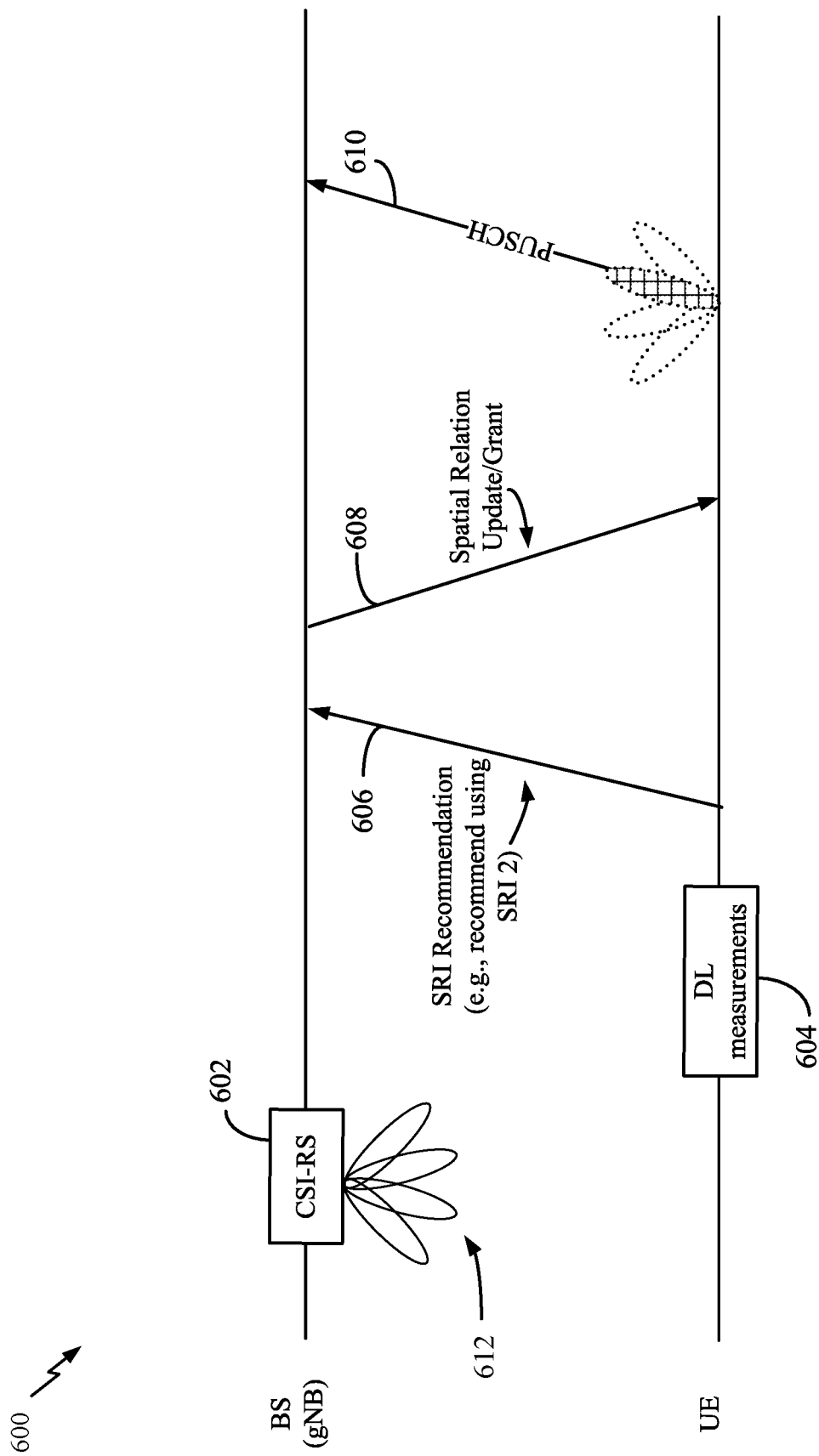
FIG. 6 illustrates a communication protocol for transmission of a sounding reference signal (SRS) resource index (SRI) selection recommendation, in accordance with certain aspects of the present disclosure.

FIG. 6 illustrates a communication protocol 600 for transmission of an SRI selection recommendation, in accordance with certain aspects of the present disclosure. As illustrated, a BS (e.g., gNB) may transmit RSs 602 (e.g., CSI-RSs or SSBs). The RSs 602 may be transmitted using multiple beams 612. As illustrated, the UE may receive the RSs 602 and perform DL measurements 604. Based on the DL measurements 604, the UE may determine to transmit a recommendation of at least one SRI to be configured for UL signaling. For example, the UE may determine at least one SRI, associated with one or more of beams 612, which was received with the highest quality, and accordingly, transmit, to the base station, an SRI recommendation message 606 recommending this SRI for SRI selection (where SRI selection is to be performed by the BS). For instance, the UE may recommend that the BS configure SRI 2 (e.g., select SRI 2) associated with one of beams 612.

In certain aspects, based on DL measurements, the UE may be able to transmit a recommendation for one or more SRIs to be used for upcoming UL communications, not to be used for upcoming UL communications (e.g., based on some measurements indicating poor beam quality) or both. In other words, the UE may determine that one or more of beams 612 are received with a quality that is a below a threshold (e.g., a single quality threshold), and recommend (e.g., request) that the BS exclude corresponding SRIs from consideration when performing SRI selection. In some cases, the UE may indicate one or more SRIs that the UE recommends to be used, as well as one or more SRIs to be excluded from consideration by the BS during SRI selection.

In some aspects, the recommendation may include a preferred bandwidth part (BWP), a preferred subband (SB), a preferred component carrier (CC), or any combination thereof, for the SRIs. In other words, the UE may also determine the preferred BWP, the SB, or the CC based on the DL measurements and indicate such preference via the SRI recommendation message 606.

In certain aspects, the recommendation may also include a DL beam recommendation to be used or not to be used for upcoming DL signaling from the BS. For example, based on the DL measurements 604, the UE may also determine one or more beams to be applied for DL signaling, one or more beams to be excluded from consideration for the DL signaling, or both, and the SRI recommendation message 606 may also indicate the DL beam recommendation for the DL signaling.

In some aspects, the recommendation may be configured to be transmitted/repeated on one or more UL beams (time division multiplexed (TDMed)) (e.g., for spatial diversity should a sudden blockage appear on the serving beam). For example, SRI recommendation message 606 may be transmitted using multiple beams (e.g., repeated in time domain) to increase the likelihood that the BS receives the recommendation from the UE.

As illustrated, the BS may consider the recommendation received from the UE, and transmit a configuration message 608 (e.g., spatial relation update or grant) indicating an SRI to be used for UL signaling 610. For example, the UL signaling may be a physical uplink shared channel (PUSCH), in some implementations. In some aspects, the SRI recommended (e.g., requested) may be for all UL channels or may be channel specific (e.g., for one or more of a PUSCH, a physical uplink control channel (PUCCH), or a channel scheduled using a configured grant (CG)). In certain aspects, the SRI recommendation message 606 may be carried on preconfigured UL control channel (e.g., PUCCH) resources or MAC-CE on an allocated PUSCH.

In certain aspects, in response to the request, the BS may send a downlink control information (DCI) or a MAC-CE message (e.g., configuration message 608) updating the SRI, and the UE may switch its UL SRI after an indicated time (e.g., K2, where, as known in the art, K2 is the time delay between a slot where the DCI was received and a slot where the UL transmission is to be transmitted) or a specified time.

In other aspects, the BS may ignore the request from the UE, and the UE may continue to use the current SRI beam. For example, the BS may ignore the recommendation in the SRI recommendation message 606, and forgo configuration of a new SRI to be used for the UL signaling.

Figure 7:
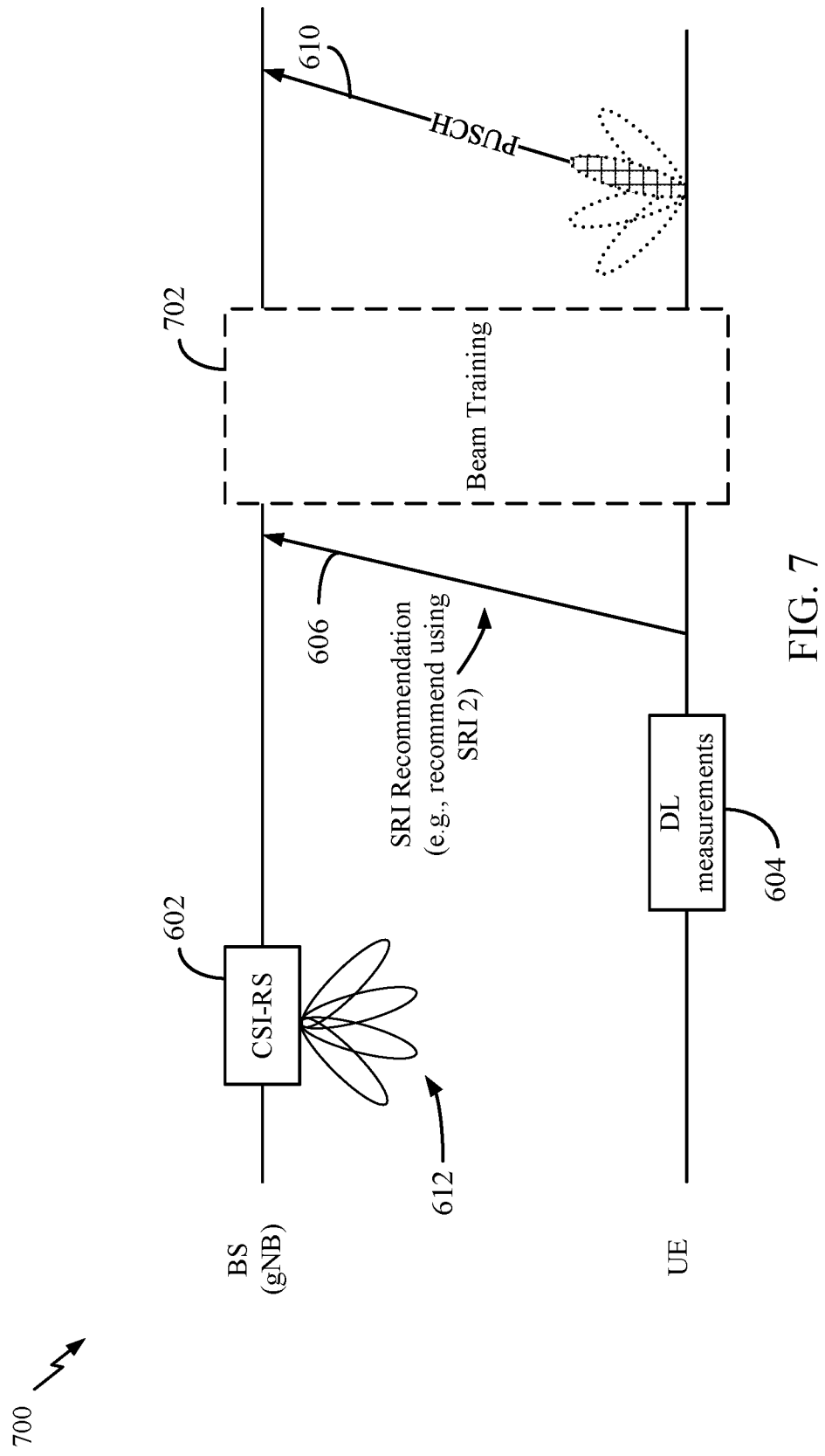
FIG. 7 illustrates a communication protocol for transmission of an SRI selection recommendation along with an SRS beam training procedure, in accordance with certain aspects of the present disclosure.

FIG. 7 illustrates a communication protocol 700 for transmission of an SRI selection recommendation along with an SRS beam training procedure 702, in accordance with certain aspects of the present disclosure. ABS (e.g., gNB) may configure the UE to trigger an UL SRS beam training procedure 702 when an SRI recommendation message 606 (e.g., an SRI request) is transmitted. In other words, in response to a decision to transmit the SRI recommendation message 606, the UE may also trigger SRS beam training. The UE may be configured by the BS to automatically begin an SRS beam training phase before or after transmission of the SRI recommendation message 606. The SRS beam training procedure may involve the UE transmitting SRSs, allowing the BS to determine an SRI to be used, while in some cases, also taking into account the SRI recommendation in SRI recommendation message 606 from the UE. As part of the SRS beam training procedure 702, the BS may indicate the selected SRI to be used for UL signaling 610 by the UE.

In certain aspects, the BS may configure the UE with rules (e.g., thresholds or specific CSI-RS/SSB resources) identifying conditions that are to be satisfied before an SRI recommendation message 606 (e.g., SRI request) may be transmitted by the UE. For example, the UE may be configured to transmit an SRI recommendation only when a quality of one or more beams of the RSs 602 (e.g., a quality of a beam associated with a currently active SRI) is below a signal quality threshold. In some cases, the BS may also configure the UE with CSI-RS resources to be used for DL measurements 604 for determining the SRI recommendations.

Example Wireless Communications Devices

Figure 8:
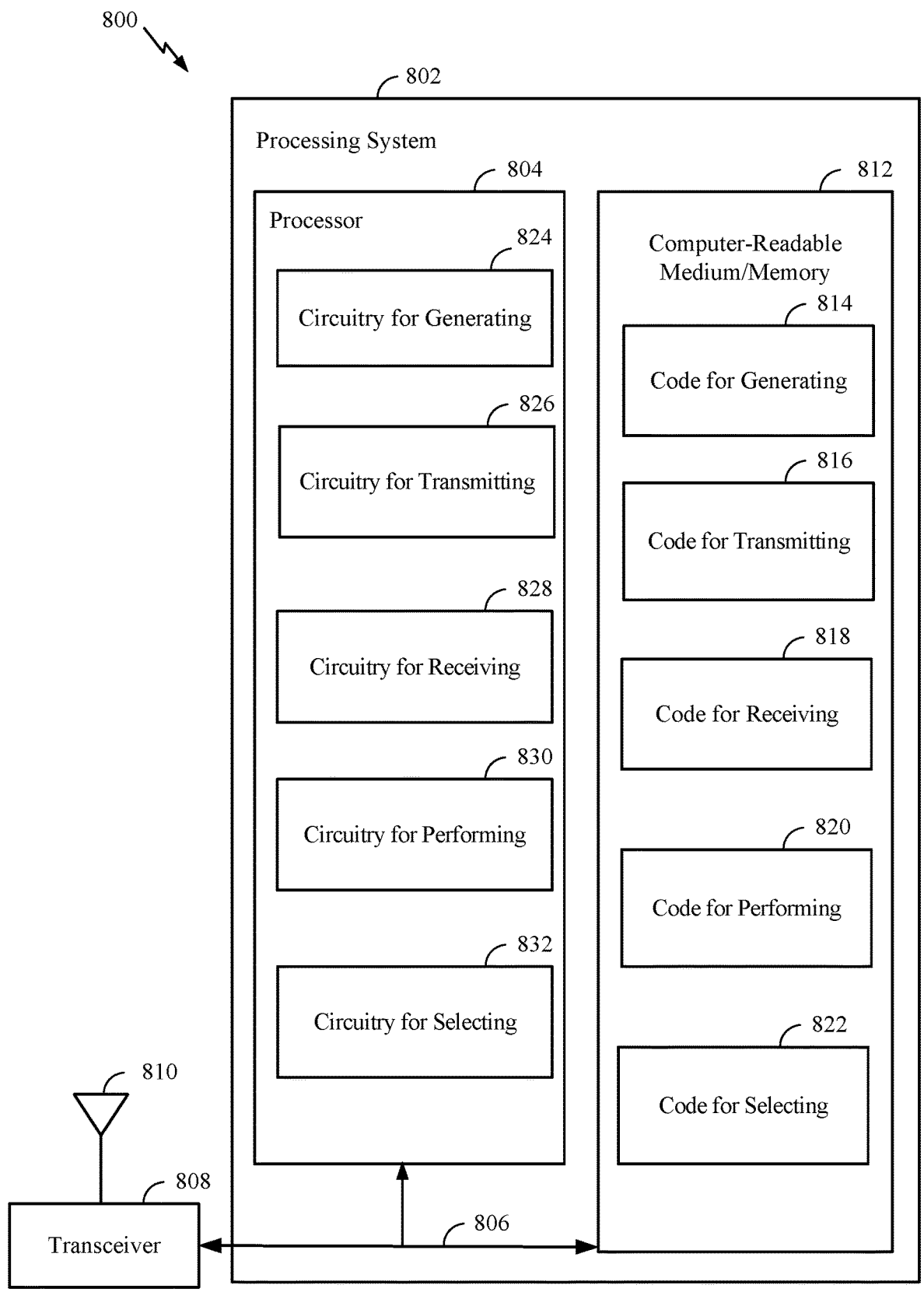
FIG. 8 illustrates a communications device that may include various components configured to perform operations for the techniques disclosed herein, in accordance with aspects of the present disclosure.

FIG. 8 illustrates a communications device 800 that may include various components (e.g., corresponding to means-plus-function components) operable, configured, or adapted to perform operations for the techniques disclosed herein, such as the operations illustrated in FIG. 4. In some examples, communications device 800 may be a base station (BS), such as BS 110a as described with respect to FIGS. 1 and 2.

Communications device 800 includes a processing system 802 (e.g., corresponding to controller/processor 240) coupled to a transceiver 808 (e.g., a transmitter and/or a receiver). Transceiver 808 may correspond to one or more of transmit processor 220, TX MIMO processor 230, modulator/demodulator 232, receive processor 238, and MIMO detector 236. Transceiver 808 is configured to transmit and receive signals for communications device 800 via an antenna 810, such as the various signals as described herein. Processing system 802 may be configured to perform processing functions for communications device 800, including processing signals received and/or to be transmitted by communications device 800.

Processing system 802 includes a processor 804 coupled to a computer-readable medium/memory 812 via a bus 806. In certain aspects, computer-readable medium/memory 812 is configured to store instructions (e.g., computer-executable code) that when executed by processor 804, cause processor 804 to perform the operations illustrated in FIG. 4, or other operations for performing the various techniques discussed herein for SRI selection.

In certain aspects, computer-readable medium/memory 812 stores code 814 (an example means for) for generating; code 816 (an example means for) for transmitting; code 818 (an example means for) for receiving; code 820 (an example means for) for performing; and code 822 (an example means for) for selecting.

In certain aspects, code 814 for generating may include code for generating at least one reference signal (RS).

In certain aspects, code 816 for transmitting may include code for transmitting the at least one RS. In certain aspects, code 816 for transmitting may include code for transmitting, to the UE, a second message indicating an SRI selected based on the recommendation, wherein the second message comprises downlink control information (DCI) or a medium access control (MAC) control element (MAC-CE). In certain aspects, code 816 for transmitting may include code for transmitting, to the UE, an indication of a condition for triggering the transmission of the recommendation. In certain aspects, code 816 for transmitting may include code 816 for transmitting an indication of RS resource to be used for performing the RS measurement.

In certain aspects, code 818 for receiving may include code for receiving, from a user equipment (UE), at least one first message indicating a recommendation for sounding reference signal (SRS) reference index (SRI) selection based on the at least one RS. In certain aspects, code 818 for receiving may include code for receiving UL signaling based on the selected SRI.

In certain aspects, code 820 for performing may include code for performing SRS beam training using configured resources in response to a decision, by the UE, to transmit the recommendation.

In certain aspects, code 822 for selecting may include code for selecting an SRI based on the recommendation.

In certain aspects, processor 804 has circuitry configured to implement the code stored in computer-readable medium/memory 812. Processor 804 includes circuitry 824 (an example means for) for generating; circuitry 826 (an example means for) for transmitting; circuitry 828 (an example means for) for receiving; circuitry 830 (an example means for) for performing; and circuitry 832 (an example means for) for selecting.

In certain aspects, circuitry 824 for generating may include circuitry for generating at least one RS.

In certain aspects, circuitry 826 for transmitting may include circuitry for transmitting the at least one RS. In certain aspects, circuitry 826 for transmitting may include circuitry for transmitting, to the UE, a second message indicating an SRI selected based on the recommendation, wherein the second message comprises DCI or a MAC-CE. In certain aspects, circuitry 826 for transmitting may include circuitry for transmitting, to the UE, an indication of a condition for triggering the transmission of the recommendation. In certain aspects, circuitry 826 for transmitting may include circuitry for transmitting an indication of RS resource to be used for performing the RS measurement.

In certain aspects, circuitry 828 for receiving may include circuitry for receiving, from a UE, at least one first message indicating a recommendation for SRI selection based on the at least one RS. In certain aspects, circuitry 828 for receiving may include circuitry for receiving UL signaling based on the selected SRI.

In certain aspects, circuitry 830 for performing may include circuitry for performing SRS beam training using configured resources in response to a decision, by the UE, to transmit the recommendation.

In certain aspects, circuitry 832 for selecting may include circuitry for selecting an SRI based on the recommendation.

In some cases, the operations illustrated in FIG. 4, as well as other operations described herein for SRI selection, may be implemented by one or more means-plus-function components. For example, in some cases, such operations may be implemented by means for generating, means for transmitting (or means for outputting for transmission), means for receiving (or means for obtaining), means for performing, and means for selecting.

In some cases, means for transmitting (or means for outputting for transmission) includes a transmitter (such as the transmit processor 220) and/or an antenna(s) 234 of BS 110*a* illustrated in FIG. 2 and/or circuitry 826 for transmitting of communications device 800 in FIG. 8.

In some cases, means for receiving (or means for obtaining) includes a receiver (such as the receive processor 238) and/or an antenna(s) 234 of BS 110*a* illustrated in FIG. 2 and/or circuitry 828 for receiving of communications device 800 in FIG. 8.

In some cases, means for generating, means for performing, and means for selecting, includes a processing system, which may include one or more processors, such as receive processor 238, transmit processor 220, TX MIMO processor 230, and/or controller/processor 240 of BS 110*a* illustrated in FIG. 2 and/or processing system 802 of communications device 800 in FIG. 8.

Figure 9:
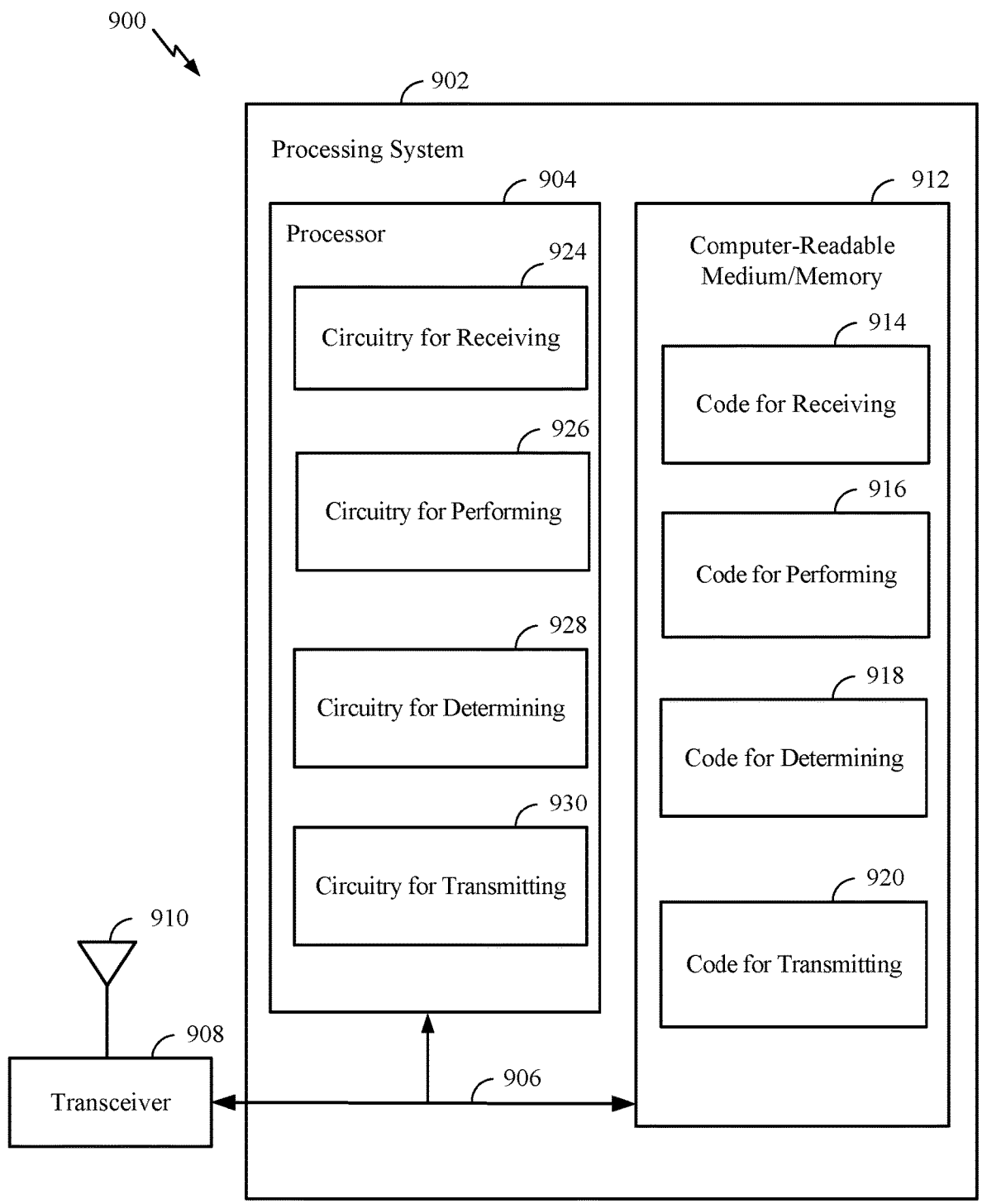
FIG. 9 illustrates a communications device that may include various components configured to perform operations for the techniques disclosed herein, in accordance with aspects of the present disclosure.

FIG. 9 illustrates a communications device 900 that may include various components (e.g., corresponding to means-plus-function components) operable, configured, or adapted to perform operations for the techniques disclosed herein, such as the operations illustrated in FIG. 5. In some examples, communications device 900 may be a UE, such as UE 120*a* as described with respect to FIGS. 1 and 2.

Communications device 900 includes a processing system 902 (e.g., corresponding to controller/processor 280) coupled to a transceiver 908 (e.g., a transmitter and/or a receiver). Transceiver 908 may correspond to one or more of transmit processor 264, TX MIMO processor 266, modulator/demodulator 254, receive processor 258, and MIMO detector 256. Transceiver 908 is configured to transmit and receive signals for communications device 900 via an antenna 910, such as the various signals as described herein. Processing system 902 may be configured to perform processing functions for communications device 900, including processing signals received and/or to be transmitted by communications device 900.

Processing system 902 includes a processor 904 coupled to a computer-readable medium/memory 912 via a bus 906. In certain aspects, computer-readable medium/memory 912 is configured to store instructions (e.g., computer-executable code) that when executed by processor 904, cause processor 904 to perform the operations illustrated in FIG. 5, or other operations for performing the various techniques discussed herein for SRI selection.

In certain aspects, computer-readable medium/memory 912 stores code 914 (an example means for) for receiving; code 916 (an example means for) for performing; code 918 (an example means for) for determining; and code 920 (an example means for) for transmitting.

In certain aspects, code 914 for receiving may include code for receiving at least one RS. In certain aspects, code 914 for receiving may include code for receiving, from the BS, a second message indicating an SRI selected based on the recommendation, wherein the second message comprises DCI or a MAC-CE. In certain aspects, code 914 for receiving may include code for receiving, from the BS, an indication of a condition for triggering the determination and the transmission of the recommendation. In certain aspects, code 914 for receiving may include code for receiving an indication of RS resources to be used for performing the RS measurement.

In certain aspects, code 916 for performing may include code for performing an RS measurement based on the at least one RS. In certain aspects, code 916 for performing may include code for performing SRS beam training using configured resources in response to a decision to transmit the recommendation.

In certain aspects, code 918 for determining may include code for determining a recommendation for SRI selection based on the RS measurement.

In certain aspects, code 920 for transmitting may include code for transmitting, to a BS, at least one first message indicating a recommendation for SRI selection determined based on the RS measurement. In certain aspects, code 920 for transmitting may include code for transmitting UL signaling based on the selected SRI to the BS.

In certain aspects, processor 904 has circuitry configured to implement the code stored in computer-readable medium/memory 912. Processor 904 includes circuitry 924 (an example means for) for receiving; circuitry 926 (an example means for) for performing; circuitry 928 (an example means for) for determining; and circuitry 930 (an example means for) for transmitting.

In certain aspects, circuitry 924 for receiving may include circuitry for receiving at least one RS. In certain aspects, circuitry 924 for receiving may include circuitry for receiving, from the BS, a second message indicating an SRI selected based on the recommendation, wherein the second message comprises DCI or a MAC-CE. In certain aspects, circuitry 924 for receiving may include circuitry for receiving, from the BS, an indication of a condition for triggering the determination and the transmission of the recommendation. In certain aspects, circuitry 924 for receiving may include circuitry for receiving an indication of RS resources to be used for performing the RS measurement.

In certain aspects, circuitry 926 for performing may include circuitry for performing an RS measurement based on the at least one RS. In certain aspects, circuitry 926 for performing may include circuitry for performing SRS beam training using configured resources in response to a decision to transmit the recommendation.

In certain aspects, circuitry 928 for determining may include circuitry for determining a recommendation for SRI selection based on the RS measurement.

In certain aspects, circuitry 930 for transmitting may include circuitry for transmitting, to a BS, at least one first message indicating a recommendation for SRI selection determined based on the RS measurement. In certain aspects, circuitry 930 for transmitting may include circuitry 930 for transmitting UL signaling based on the selected SRI to the BS.

In some cases, the operations illustrated in FIG. 4, as well as other operations described herein for SRI selection, may be implemented by one or more means-plus-function components. For example, in some cases, such operations may be implemented by means for receiving (or means for obtaining), means for performing, means for determining, and means for transmitting (or means for outputting for transmission).

In some cases, means for transmitting (or means for outputting for transmission) includes a transmitter (such as the transmit processor 264) and/or an antenna(s) 252 of UE 120*a* illustrated in FIG. 2 and/or circuitry 930 for transmitting of communications device 900 in FIG. 9.

In some cases, means for receiving (or means for obtaining) includes a receiver (such as the receive processor 258) and/or an antenna(s) 252 of UE 120*a* illustrated in FIG. 2 and/or circuitry 924 for receiving of communications device 900 in FIG. 9.

In some cases, means for performing and means for performing and means for determining, includes a processing system, which may include one or more processors, such as receive processor 258, transmit processor 264, TX MIMO processor 266, and/or controller/processor 280 of UE 120*a* illustrated in FIG. 2 and/or processing system 902 of communications device 900 in FIG. 9.

SRI manager 112 and 122 may support wireless communication in accordance with examples as disclosed herein.

SRI manager 112 and 122 may be an example of means for performing various aspects described herein. SRI manager 112 and 122, or its sub-components, may be implemented in hardware (e.g., in uplink (UL) resource management circuitry). The circuitry may comprise of processor, DSP, an ASIC, a FPGA or other programmable logic device, discrete gate or transistor logic, discrete hardware components, or any combination thereof designed to perform the functions described in the present disclosure.

In another implementation, SRI manager 112 and 122, or its sub-components, may be implemented in code (e.g., as configuration management software or firmware) executed by a processor, or any combination thereof. If implemented in code executed by a processor, the functions of SRI manager 112 and 122, or its sub-components may be executed by a general-purpose processor, a DSP, an ASIC, a FPGA or other programmable logic device.

In some examples, SRI manager 112 and 122 may be configured to perform various operations (e.g., receiving, determining, transmitting) using or otherwise in cooperation with the transceiver 808 or 908.

SRI manager 112 and 122, or its sub-components, may be physically located at various positions, including being distributed such that portions of functions are implemented at different physical locations by one or more physical components. In some examples, SRI manager 112 and 122, or its sub-components, may be a separate and distinct component in accordance with various aspects of the present disclosure. In some examples, SRI manager 112 and 122, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

Example Clauses

Implementation examples are described in the following numbered clauses:

Clause 1: A method for wireless communication by a user equipment (UE), comprising: receiving at least one reference signal (RS); performing an RS measurement based on the at least one RS; and transmitting, to a base station (BS), at least one first message indicating a recommendation for sounding reference signal (SRS) reference index (SRI) selection determined based on the RS measurement.

Clause 2: The method of Clause 1, wherein the at least one RS comprises a channel state information (CSI)-RS, a synchronization signal block (SSB), or a demodulation RS (DMRS).

Clause 3: The method of Clause 1 or 2, wherein the recommendation comprises a recommendation of one or more SRIs to be used for uplink (UL) signaling by the UE.

Clause 4: The method of any of Clauses 1-3, wherein the recommendation comprises a recommendation of one or more SRIs to be excluded from consideration when performing the SRI selection.

Clause 5: The method of any of Clauses 1-4, wherein the at least one first message further indicates at least one of a preferred bandwidth part (BWP), a preferred subband (SB), or a preferred component carrier (CC) to be used for UL signaling by the UE.

Clause 6: The method of any of Clauses 1-5, wherein the at least one first message further indicates a recommendation of a beam to be used for downlink (DL) signaling.

Clause 7: The method of any of Clauses 1-6, wherein the at least one first message is transmitted using a plurality of beams.

Clause 8: The method of any of Clauses 1-7, wherein the at least one first message is repeated in a time domain.

Clause 9: The method of any of Clauses 1-8, wherein the recommendation is to be used for SRI selection for at least one of a physical uplink shared channel (PUSCH), a physical uplink control channel (PUCCH), or a channel scheduled using a configured grant (CG).

Clause 10: The method of any of Clauses 1-9, wherein the at least one first message is transmitted using configured UL control channel resources or a medium access control (MAC) control element (MAC-CE).

Clause 11: The method of any of Clauses 1-10, further comprising: receiving, from the BS, a second message indicating an SRI selected based on the recommendation; and transmitting UL signaling based on the selected SRI to the BS.

Clause 12: The method of any of Clauses 1-11, further comprising performing SRS beam training using configured resources in response to a decision to transmit the recommendation.

Clause 13: The method of any of Clauses 1-12, further comprising receiving, from the BS, an indication of a condition for triggering the determination of the recommendation and the transmission of the at least one first message indicating the recommendation.

Clause 14: The method of Clause 13, wherein the indication of the condition comprises an indication of a signal quality threshold associated with the RS measurement.

Clause 15: The method of any of Clauses 1-14, further comprising receiving an indication of RS resources to be used for performing the RS measurement.

Clause 16: A method for wireless communication by a base station (BS), comprising: generating at least one reference signal (RS); transmitting the at least one RS; and receiving, from a user equipment (UE), at least one first message indicating a recommendation for sounding reference signal (SRS) reference index (SRI) selection based on the at least one RS.

Clause 17: The method of Clause 16, wherein the at least one RS comprises a channel state information (CSI)-RS, a synchronization signal block (SSB), or a demodulation RS (DMRS).

Clause 18: The method of Clause 16 or 17, wherein the recommendation comprises a recommendation of one or more SRIs to be used for uplink (UL) signaling by the UE.

Clause 19: The method of any of Clauses 16-18, wherein the recommendation comprises a recommendation of one or more SRIs to be excluded from consideration when performing the SRI selection.

Clause 20: The method of any of Clauses 16-19, wherein the at least one first message further indicates at least one of a preferred bandwidth part (BWP), a preferred subband (SB), or a preferred component carrier (CC) to be used for UL signaling by the UE.

Clause 21: The method of any of Clauses 16-20, wherein the at least one first message further indicates a recommendation of a beam to be used for downlink (DL) signaling.

Clause 22: The method of any of Clauses 16-21, wherein the at least one first message is transmitted using a plurality of beams.

Clause 23: The method of any of Clauses 16-22, wherein the at least one first message is repeated in a time domain.

Clause 24: The method of any of Clauses 16-23, wherein the recommendation is to be used for SRI selection for at least one of a physical uplink shared channel (PUSCH), a physical uplink control channel (PUCCH), or a channel scheduled using a configured grant (CG).

Clause 25: The method of any of Clauses 16-24, wherein the at least one first message is transmitted using configured UL control channel resources or a medium access control (MAC) control element (MAC-CE).

Clause 26: The method of any of Clauses 16-25, further comprising: selecting an SRI based on the recommendation; and transmitting, to the UE, a second message indicating an SRI selected based on the recommendation; and receiving UL signaling based on the selected SRI.

Clause 27: The method of any of Clauses 16-26, further comprising performing SRS beam training using configured resources in response to the recommendation.

Clause 28: The method of any of Clauses 16-27, further comprising transmitting, to the UE, an indication of a condition for triggering transmission of the at least one first message indicating the recommendation.

Clause 29: An apparatus, comprising: at least one processor; and a memory coupled to the at least one processor, the memory including instructions executable by the at least one processor to cause the apparatus to perform a method in accordance with any one of Clauses 1-28.

Clause 30: An apparatus, comprising means for performing a method in accordance with any one of Clauses 1-28.

Clause 31: A non-transitory computer-readable medium comprising executable instructions that, when executed by one or more processors of an apparatus, cause the apparatus to perform a method in accordance with any one of Clauses 1-28.

Additional Considerations

The techniques described herein may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), Institute of Electrical and Electronics Engineers (IEEE) 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

In 3GPP, the term "cell" can refer to a coverage area of a Node B (NB) and/or a NB subsystem serving this coverage area, depending on the context in which the term is used. In NR systems, the term "cell" and base station (BS), next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by user equipments (UEs) with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. BSs are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIGS. 4 and 5.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. A method for wireless communication by a user equipment (UE), comprising:
   receiving at least one reference signal (RS);
   performing an RS measurement based on the at least one RS; and
   transmitting, to a base station (BS), at least one first message indicating a recommendation for sounding reference signal (SRS) reference index (SRI) selection determined based on the RS measurement, wherein the recommendation comprises a recommendation of one or more SRIs to be excluded from consideration when performing the SRI selection.

2. The method of claim 1, wherein the at least one RS comprises a channel state information (CSI)-RS, a synchronization signal block (SSB), or a demodulation RS (DMRS).

3. The method of claim 1, wherein the recommendation further comprises a recommendation of one or more SRIs to be used for uplink (UL) signaling by the UE.

4. The method of claim 1, wherein the at least one first message further indicates at least one of a preferred bandwidth part (BWP), a preferred subband (SB), or a preferred component carrier (CC) to be used for UL signaling by the UE.

5. The method of claim 1, wherein the at least one first message further indicates a recommendation of a beam to be used for downlink (DL) signaling.

6. The method of claim 1, wherein the at least one first message is transmitted using a plurality of beams.

7. The method of claim 1, wherein the at least one first message is repeated in a time domain.

8. The method of claim 1, wherein the recommendation is to be used for SRI selection for at least one of a physical uplink shared channel (PUSCH), a physical uplink control channel (PUCCH), or a channel scheduled using a configured grant (CG).

9. The method of claim 1, wherein the at least one first message is transmitted using configured UL control channel resources or a medium access control (MAC) control element (MAC-CE).

10. The method of claim 1, further comprising:
    receiving, from the BS, a second message indicating an SRI selected based on the recommendation; and
    transmitting UL signaling based on the selected SRI to the BS.

11. The method of claim 1, further comprising performing SRS beam training using configured resources in response to a decision to transmit the recommendation.

12. The method of claim 1, further comprising receiving, from the BS, an indication of a condition for triggering the determination of the recommendation and the transmission of the at least one first message indicating the recommendation.

13. The method of claim 12, wherein the indication of the condition comprises an indication of a signal quality threshold associated with the RS measurement.

14. The method of claim 1, further comprising receiving an indication of RS resources to be used for performing the RS measurement.

15. A method for wireless communication by a base station (BS), comprising:
generating at least one reference signal (RS);
transmitting the at least one RS; and
receiving, from a user equipment (UE), at least one first message indicating a recommendation for sounding reference signal (SRS) reference index (SRI) selection based on the at least one RS, wherein the recommendation comprises a recommendation of one or more SRIs to be excluded from consideration when performing the SRI selection.

16. The method of claim 15, wherein the at least one RS comprises a channel state information (CSI)-RS, a synchronization signal block (SSB), or a demodulation RS (DMRS).

17. The method of claim 15, wherein the recommendation further comprises a recommendation of one or more SRIs to be used for uplink (UL) signaling by the UE.

18. The method of claim 15, wherein the at least one first message further indicates at least one of a preferred bandwidth part (BWP), a preferred subband (SB), or a preferred component carrier (CC) to be used for UL signaling by the UE.

19. The method of claim 15, wherein the at least one first message further indicates a recommendation of a beam to be used for downlink (DL) signaling.

20. The method of claim 15, wherein the at least one first message is transmitted using a plurality of beams.

21. The method of claim 15, wherein the at least one first message is repeated in a time domain.

22. The method of claim 15, wherein the recommendation is to be used for SRI selection for at least one of a physical uplink shared channel (PUSCH), a physical uplink control channel (PUCCH), or a channel scheduled using a configured grant (CG).

23. The method of claim 15, wherein the at least one first message is transmitted using configured UL control channel resources or a medium access control (MAC) control element (MAC-CE).

24. The method of claim 15, further comprising:
selecting an SRI based on the recommendation;
transmitting, to the UE, a second message indicating an SRI selected based on the recommendation; and
receiving UL signaling based on the selected SRI.

25. The method of claim 15, further comprising performing SRS beam training using configured resources in response to the recommendation.

26. The method of claim 15, further comprising transmitting, to the UE, an indication of a condition for triggering transmission of the at least one first message indicating the recommendation.

27. An apparatus for wireless communication by a user equipment (UE), comprising:
a memory; and
one or more processors coupled to the memory, the memory and the one or more processors being configured to:
receive at least one reference signal (RS);
perform an RS measurement based on the at least one RS; and
transmit, to a base station (BS), at least one first message indicating a recommendation for sounding reference signal (SRS) reference index (SRI) selection determined based on the RS measurement, wherein the recommendation comprises a recommendation of one or more SRIs to be excluded from consideration when performing the SRI selection.

28. An apparatus for wireless communication by a base station (BS), comprising:
a memory; and
one or more processors coupled to the memory, the memory and the one or more processors being configured to:
generate at least one reference signal (RS);
transmit the at least one RS; and
receive, from a user equipment (UE), at least one first message indicating a recommendation for sounding reference signal (SRS) reference index (SRI) selection based on the at least one RS, wherein the recommendation comprises a recommendation of one or more SRIs to be excluded from consideration when performing the SRI selection.

* * * * *